United States Patent
Plisko et al.

(10) Patent No.: US 10,826,819 B2
(45) Date of Patent: Nov. 3, 2020

(54) SYSTEM AND METHOD FOR DATA TRANSMISSION IN DISTRIBUTED COMPUTING ENVIRONMENTS

(71) Applicant: RepliXio LTD., Tel-Aviv (IL)

(72) Inventors: Cyril Plisko, Petah Tikva (IL); Sam Genzel, Jerusalem (IL); Andrey Vesnovaty, Holon (IL); Michael Greenberg-Smirnoff, Tel Aviv (IL); Avi Shillo, Kfar Saba (IL)

(73) Assignee: RepliXio LTD., Tel-Aviv (IL)

( * ) Notice: Subject to any disclaimer, the term of this patent is extended or adjusted under 35 U.S.C. 154(b) by 0 days.

(21) Appl. No.: 16/794,606

(22) Filed: Feb. 19, 2020

(65) Prior Publication Data

US 2020/0186461 A1    Jun. 11, 2020

Related U.S. Application Data

(63) Continuation of application No. PCT/US2019/040791, filed on Jul. 8, 2019.

(60) Provisional application No. 62/695,223, filed on Jul. 9, 2018.

(51) Int. Cl.
| | |
|---|---|
| *H04L 12/727* | (2013.01) |
| *H04L 12/935* | (2013.01) |
| *G06F 3/06* | (2006.01) |
| *H04L 12/725* | (2013.01) |
| *H04L 12/707* | (2013.01) |

(52) U.S. Cl.
CPC .......... *H04L 45/302* (2013.01); *H04L 45/121* (2013.01); *H04L 45/22* (2013.01); *H04L 49/3018* (2013.01); *G06F 3/067* (2013.01); *G06F 2212/1024* (2013.01)

(58) Field of Classification Search
CPC ..... H04L 67/1097; H04L 45/24; H04L 45/30; H04L 63/1425; G06F 3/067; G06F 11/2094; G06F 2212/1024
See application file for complete search history.

(56) References Cited

U.S. PATENT DOCUMENTS

| | | | |
|---|---|---|---|
| 7,689,764 B1 | 3/2010 | Spiegeleer et al. | |
| 9,769,101 B2 * | 9/2017 | Tejaprakash | ............ H04L 51/14 |
| 10,015,229 B2 * | 7/2018 | Barajas Gonzalez | ........................ H04L 67/2804 |

(Continued)

FOREIGN PATENT DOCUMENTS

WO    2017184807 A1    10/2017

*Primary Examiner* — Raj Jain
(74) *Attorney, Agent, or Firm* — M&B IP Analysts, LLC

(57) ABSTRACT

A system and method for transmitting data in a distributed computing environment. The method includes transmitting a first portion of data from an origin to a destination using a first communication route, wherein the first communication route is selected based on characteristics of each of a first plurality of potential communication routes, wherein the first portion of data consists of metadata, wherein the first communication route is an optimal communication route for transmitting metadata; and transmitting a second portion of data from the origin to the destination using a second communication route, wherein the second communication route is selected based on characteristics of each of a second plurality of potential communication routes, wherein the second portion of data excludes metadata, wherein the second communication route is an optimal communication route for transmitting data other than metadata.

12 Claims, 5 Drawing Sheets

(56) References Cited

U.S. PATENT DOCUMENTS

| | | | |
|---|---|---|---|
| 2003/0182328 A1* | 9/2003 | Paquette | G06F 16/27 |
| 2008/0059989 A1* | 3/2008 | O'Connor | A23L 2/52 |
| | | | 725/9 |
| 2012/0089889 A1* | 4/2012 | Gladwin | G06F 16/182 |
| | | | 714/770 |
| 2013/0013883 A1* | 1/2013 | Kottomtharayil | G06F 16/10 |
| | | | 711/171 |
| 2015/0350366 A1 | 12/2015 | Ananthanarayanan et al. | |
| 2017/0054748 A1* | 2/2017 | Allen | H04L 63/1425 |
| 2019/0327301 A1* | 10/2019 | De Keyser | G06F 11/1044 |
| 2020/0186461 A1* | 6/2020 | Plisko | H04L 45/22 |

* cited by examiner

SYSTEM AND METHOD FOR DATA TRANSMISSION IN DISTRIBUTED COMPUTING ENVIRONMENTS

CROSS-REFERENCE TO RELATED APPLICATIONS

This application is a continuation of International Patent Application No. PCT/US2019/040791 filed on Jul. 8, 2019, now pending, which claims the benefit of U.S. Provisional Application No. 62/695,223 filed on Jul. 9, 2018, the contents of which are hereby incorporated by reference.

TECHNICAL FIELD

The present disclosure relates generally to distributed computing, and more particularly for transmitting data in distributed computing environments.

BACKGROUND

Modern information technology (IT) environments are not homogenous. Many of these modern IT environments are distributed computing environments featuring multiple systems transmitting data to each other over one or more networks. Such systems work together in order to effectively act as components of a larger system. To this end, modern IT environments include traditional data centers, private clouds, public clouds, or in many cases a combination of these. Due to the benefits provided by cloud computing, enterprises are increasingly shifting their IT workloads to cloud computing infrastructures.

Many enterprises eventually choose to deploy their IT workloads using multiple cloud computing infrastructures simultaneously. This may be done for reason such as vendor independency, redundancy, cost control, and the like. In particular, hybrid cloud computing, in which an enterprise uses a combination of a private cloud and public cloud services, has seen increased use in recent years. For example, hybrid cloud usage increased to 57% of total enterprise cloud deployments in 2016, up 19% from the hybrid cloud usage in 2015. Thus, such enterprises utilize distributed computing among cloud computing environments.

The amount of data being generated and/or collected by enterprises continues to increase over time. The increasing amount of data may limit the ability of computing resources used by enterprises in effectively transmitting data among nodes. For example, when a large amount of data is stored in a storage that is not geographically proximate to a data platform to which data should be transmitted (e.g., a storage on the east coast of the USA and a data platform on the west coast), latency and bandwidth during transmission substantially reduce the ability to transmit the data in a timely manner and ultimately increase the amount of computing resources needed for transmission.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for transmitting data in a distributed computing environment. The method comprises: transmitting, by a delivery system configured to control transmission of data from an origin over at least one network, a first portion of data from the origin to a destination using a first communication route, wherein the first communication route is selected from among a first plurality of potential communication routes based on a plurality of characteristics of each of the first plurality of potential communication routes, wherein the first portion of data consists of metadata, wherein the first communication route is an optimal communication route for transmitting metadata, wherein each of the origin and the destination is a data storage; and transmitting, by the delivery system, a second portion of data from the origin to the destination using a second communication route, wherein the second communication route is selected from among a second plurality of potential communication routes based on a plurality of characteristics of each of the second plurality of potential communication routes, wherein the second portion of data excludes metadata, wherein the second communication route is an optimal communication route for transmitting data other than metadata.

Certain embodiments disclosed herein also include a non-transitory computer readable medium having stored thereon causing a processing circuitry to execute a process, the process comprising: transmitting, by a delivery system configured to control transmission of data from an origin over at least one network, a first portion of data from the origin to a destination using a first communication route, wherein the first communication route is selected from among a first plurality of potential communication routes based on a plurality of characteristics of each of the first plurality of potential communication routes, wherein the first portion of data consists of metadata, wherein the first communication route is an optimal communication route for transmitting metadata, wherein each of the origin and the destination is a data storage; and transmitting, by the delivery system, a second portion of data from the origin to the destination using a second communication route, wherein the second communication route is selected from among a second plurality of potential communication routes based on a plurality of characteristics of each of the second plurality of potential communication routes, wherein the second portion of data excludes metadata, wherein the second communication route is an optimal communication route for transmitting data other than metadata.

Certain embodiments disclosed herein also include a system for transmitting data in a distributed computing environment. The system comprises: a processing circuitry; and a memory, the memory containing instructions that, when executed by the processing circuitry, configure the system to: transmit a first portion of data from an origin to a destination using a first communication route, wherein the first communication route is selected from among a first plurality of potential communication routes based on a plurality of characteristics of each of the first plurality of potential communication routes, wherein the first portion of data consists of metadata, wherein the first communication route is an optimal communication route for transmitting metadata, wherein each of the origin and the destination is a data storage, wherein the system is configured to control transmission of data from the origin over at least one network; and transmit a second portion of data from the origin to the destination using a second communication route, wherein the second communication route is selected from among a second plurality of potential communication routes based on a plurality of characteristics of each of the second plurality of potential communication routes, wherein the second portion of data excludes metadata, wherein the second communication route is an optimal communication route for transmitting data other than metadata.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
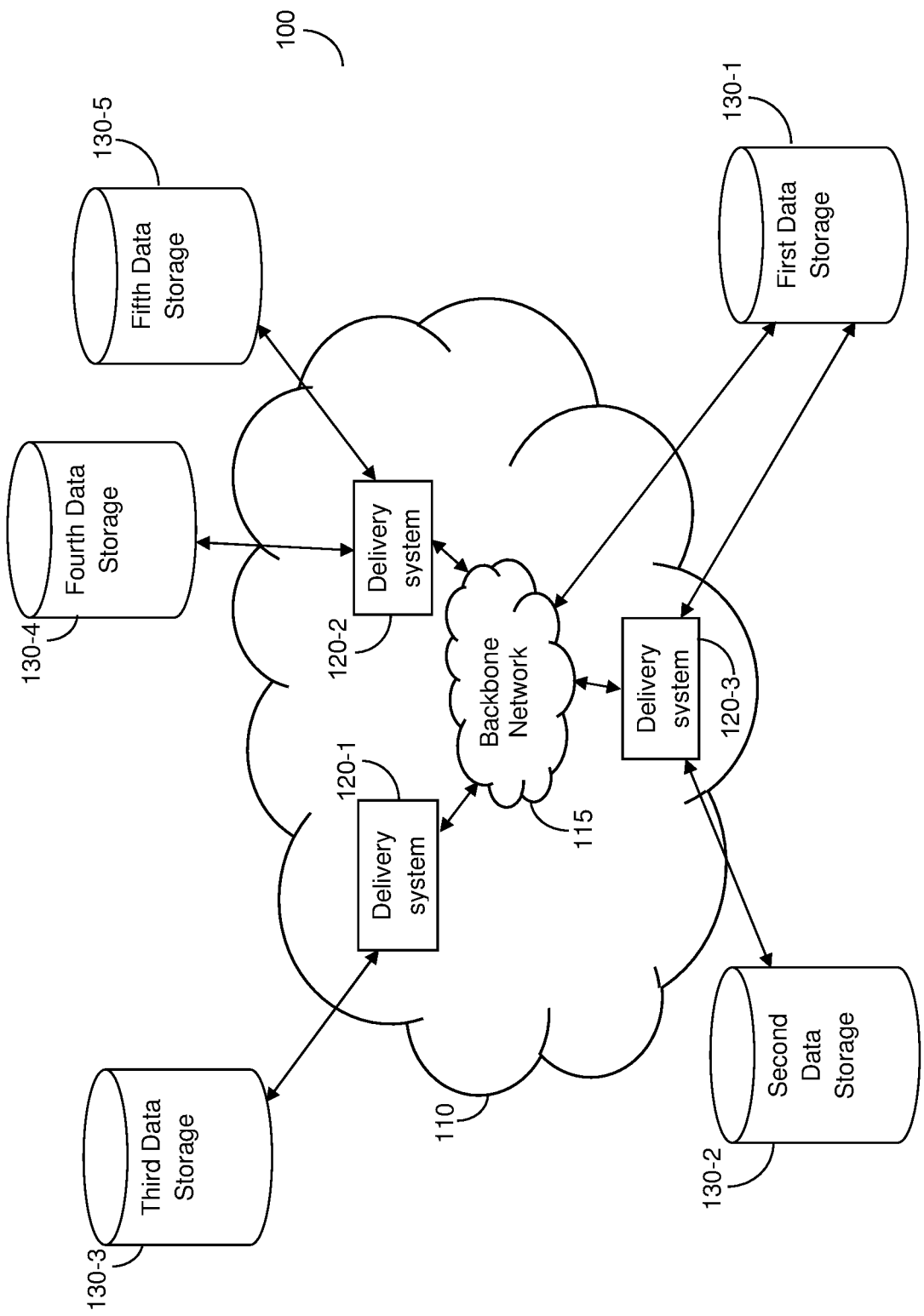
FIG. 1 is a network diagram of a computing architecture utilized according to various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

To address the challenges noted above, techniques for improving bandwidth and latency during data transmission in distributed computing environments are required. In this regard, it has been identified that practical requirements for transmitting metadata differ from practical requirements for transmitting other types of data such that transmitting metadata and other types of data using the same communication routes often result in inefficient use of networking resources, unnecessary delay in receiving metadata, or both.

In particular, it has been identified that, for transmitting metadata which may include less total data that is required earlier than other data, it is more important to send the metadata over the shortest route, and that the rate of transfer is less important than the length of time for transmitting each packet of data. Thus, low latency is more important for transmitting metadata. Likewise, for other types of data which may include more total data but is not required as quickly as metadata, the rate of transfer may be more important than the length of time for transmitting each packet of data. Thus, high bandwidth is more important for transmitting data other than metadata.

To this end, the disclosed embodiments provide techniques for transmitting data in distributed computing environments that optimize data transmission by utilizing routes optimized for metadata and other data. Such a distributed computing environment includes multiple systems communicating over one or more networks. In various disclosed embodiments, the multiple systems include at least storages containing data that may be needed by other systems in the distributed computing environment.

The various disclosed embodiments include a method and system for data transmission in distributed computing environments. A request to transmit first data and second data from a first storage device to a second storage device is received. The first data includes metadata. The first data is transmitted using a first communication route between the first storage device and the second storage device. The second data is transmitted using a second communication route between the first storage device and the second storage device.

Each of the first communication route and the second communication route is selected based at least on characteristics of potential communication routes between the first storage device and the second storage device, and may be further determined based on characteristics of the respective data to be transmitted. More specifically, the first and second communication routes are selected based on first selection rules and second selection rules, respectively. The first selection rules are predetermined rules for determining an optimal communication route for transmitting metadata. The second selection rules are predetermined rules for determining an optimal communication route for transmitting data other than metadata.

FIG. 1 shows an example network diagram 100 utilized to describe the various disclosed embodiments. In the example network diagram 100, data is transmitted among data storages 130-1 through 130-5 (hereinafter referred to collectively as data storages 130 or individually using its respective reference number) by delivery systems 120-1 through 120-3 (hereinafter referred to collectively as delivery systems 120 or individually as a delivery system 120) via a network 110 and backbone network 115. Each of the network 110 and the backbone network 115 may be, but is not limited to, a wireless, cellular or wired network, a local area network (LAN), a wide area network (WAN), a metro area network (MAN), the Internet, the worldwide web (WWW), similar networks, and any combination thereof.

The data storages 130 store data including metadata and other data (i.e., data other than metadata). Such data may be utilized by respective local systems (not shown) to provide services or otherwise perform tasks by those local systems. Each storage device 130 may be, but is not limited to, a block device (e.g., Small Computer System Interface [SCSI], Internet SCSI [iSCSI], Non-Volatile Memory Express [NVMe], etc.), a file system (e.g., Network File System [NFS], Server Message Block [SMB], Common Internet File System [CIFS], Hadoop® File System, etc.) an object storage (e.g., Amazon® Web Services [AWS] S3, Cloud Data Management Interface [CDMI], etc.), a database (e.g., a database using Structured Query Language [SQL] or non SQL [NoSQL]).

During normal operation, data from one of the data storages 130 may be required for use by a remote system. To allow use of the required data, the data may be transmitted from its origin (e.g., the data storage 130-1) to a destination (e.g., the data storage 130-2) that is local to the system that requires it.

Each delivery system 120 is configured to control data transmission from the origin. To this end, in an embodiment, each delivery system 120 is configured to determine a route to be used for transmitting data and metadata from an origin to a destination as described herein. To this end, each delivery system includes a processing circuitry and a memory (not shown in FIG. 1), the memory containing instructions that, when executed by the processing circuitry, configure the delivery system 120 to perform at least a portion of the disclosed embodiments. An example delivery system 120 is described further herein below with respect to FIG. 5.

Each of the delivery systems 120 is connected to one or more networks that allow for transmitting data between origins and destinations among the storage devices 130 (e.g., the network 110 or any networks included therein). Any of the delivery systems 120 may further be connected directly to each other, to a backbone network (e.g., the backbone network 115), or both, in order to transmit information among the delivery systems 120. Each backbone network 115 may be any network connected to two or more of the storage devices 120. Connections to other delivery systems 120 directly or through a backbone network allow for establishing multiple communication routes for transmitting data, each of which may have advantages and disadvantages for transmitting particular types of data.

It should be noted that FIG. 1 is described with respect to three delivery systems 120 and five data storages 130 merely for demonstrative purposes in order to show various example configurations and implementations of the disclosed embodiments. Other numbers of delivery systems, data storages, or both, may be equally utilized consistent with the disclosed embodiments. The arrangements of such delivery systems and data storages may be according to any combination of the disclosed configurations or any other configurations that are consistent with the disclosed embodiments.

Figure 2:
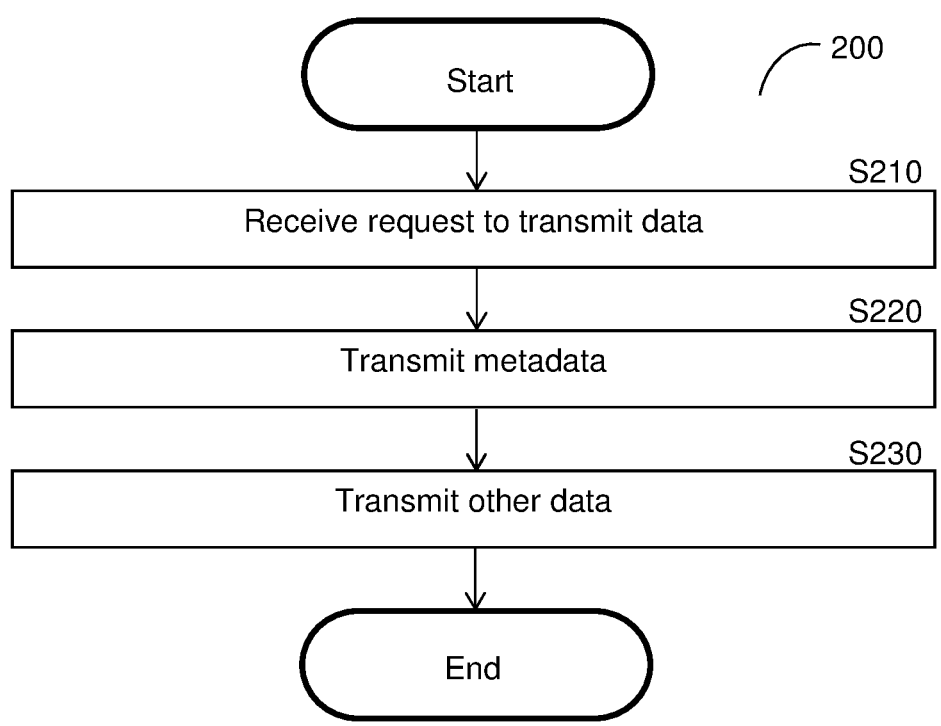
FIG. 2 is a flowchart illustrating a method for data transmission in a distributed computing environment according to an embodiment.

FIG. 2 is an example flowchart 200 illustrating a method for transmitting data in a distributed computing environment according to an embodiment. In an embodiment, the method is performed by one of the delivery systems 120, FIG. 1.

At S210, a request to transmit data from an origin to a destination is received. The data includes metadata and data other than metadata. In an example implementation, each of the origin and the destination is a data storage (e.g., one of the data storages 130, FIG. 1). In a further example, the request is received from the origin. The data to be transmitted may be stored in one or more queues of the origin. In some implementation, the receiving delivery system 120 may communicate with the origin over a backbone network in order to receive the data to be transmitted.

In an embodiment, S210 may further include splitting the data (i.e., original data) that is received from the origin into metadata and other data. It should be noted that, in an embodiment, the metadata describes the data and the other data describes the rest of the data that is not the metadata.

In an embodiment, S210 may further include transmitting one or more acknowledgment signals to the origin when data is received at the delivery system 120. For example, a first acknowledgment signal may be sent when the metadata is received, and a second acknowledgment signal may be sent when the other data is received. As a further example, a third acknowledgment signal may be sent when both the metadata and other data have been received.

At S220, the metadata is transmitted using a first communication route. The first communication route is a route which prioritizes speed of delivery to the destination as determined based on a first set of communication route selection rules with respect to characteristics of the metadata and potential communication routes. Determining the first communication route is now described further with respect to FIG. 3.

Figure 3:
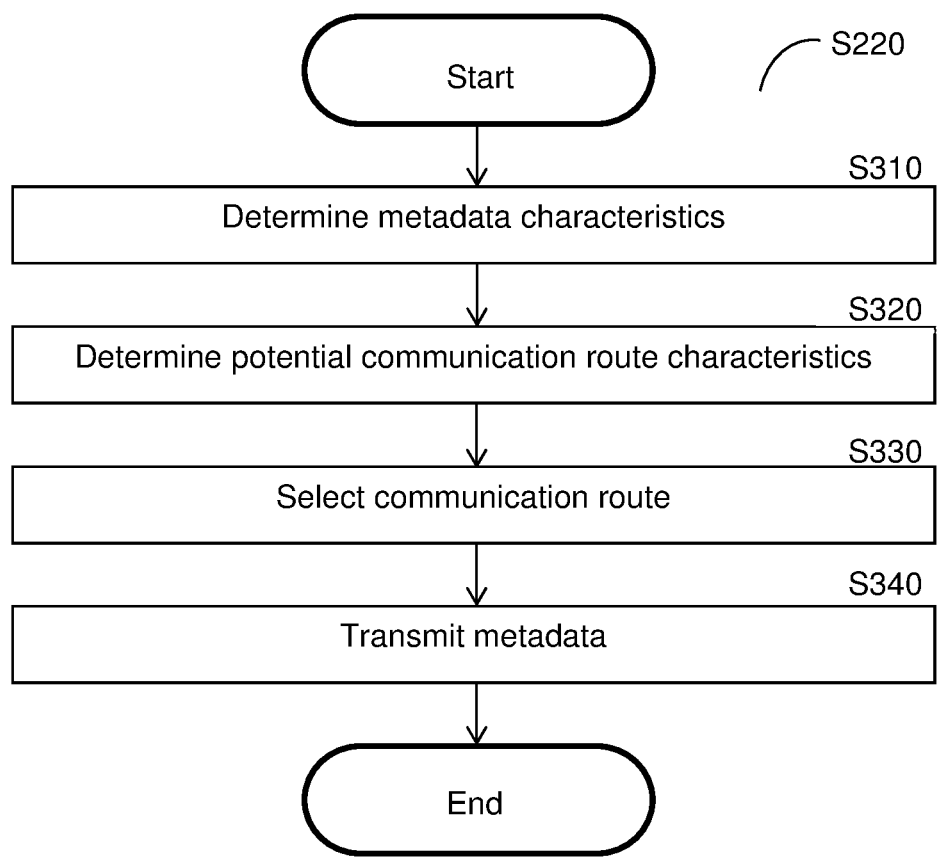
FIG. 3 is a flowchart illustrating a method for determining a preferred communication route for transmitting metadata in a distributed computing environment according to an embodiment.

FIG. 3 is a flowchart S220 illustrating a method for transmitting metadata in a distributed computing environment according to an embodiment. In an embodiment, the method is performed by one of the delivery systems 120, FIG. 1.

At optional S310, a set of characteristics of the metadata is determined. The metadata characteristics may include, but are not limited to, total size.

At S320, a set of characteristics associated with each of multiple potential communication routes is determined. In an embodiment, the potential communication route characteristics for metadata transmission include at least latency.

At S330, a communication route for transmitting the metadata is selected based on the sets of characteristics of the metadata and each of the potential communication routes.

In an embodiment, S330 is based on a set of one or more metadata communication route selection rules. The metadata communication route selection rules are predetermined rules prioritize speed of transmission of portions of the metadata to the destination. In this regard, it has been identified that, for transmission of metadata, it is desirable to transmit the metadata as soon as possible but rate of data transfer is not as important. To this end, in an embodiment, the metadata communication route selection rules prioritize low latency over other factors such as, but not limited to, high bandwidth. Thus, although other communication routes may have higher bandwidth, the communication route selected to be used for transmitting metadata would be a communication route having lower latency than that of other communication routes since such low latency is better for transmitting metadata.

The metadata communication route selection rules may further take into consideration characteristics of the metadata such as, but not limited to, total size of the metadata. To this end, the metadata communication route selection rules may establish minimum thresholds for, for example, bandwidth. Thus, even though low latency is prioritized, bandwidth may be required to meet such a minimum threshold in order to ensure that the entire set of metadata is transmitted promptly.

At S340, the metadata is transmitted using the selected communication route.

Returning to FIG. 2, at S230, the data other than metadata is transmitted from the origin to the destination using a second communication route. In an embodiment, S230 may include storing the other data in the delivery system 120 until the destination is updated with the other data. Determining the second communication route is now described further with respect to FIG. 4.

Figure 4:
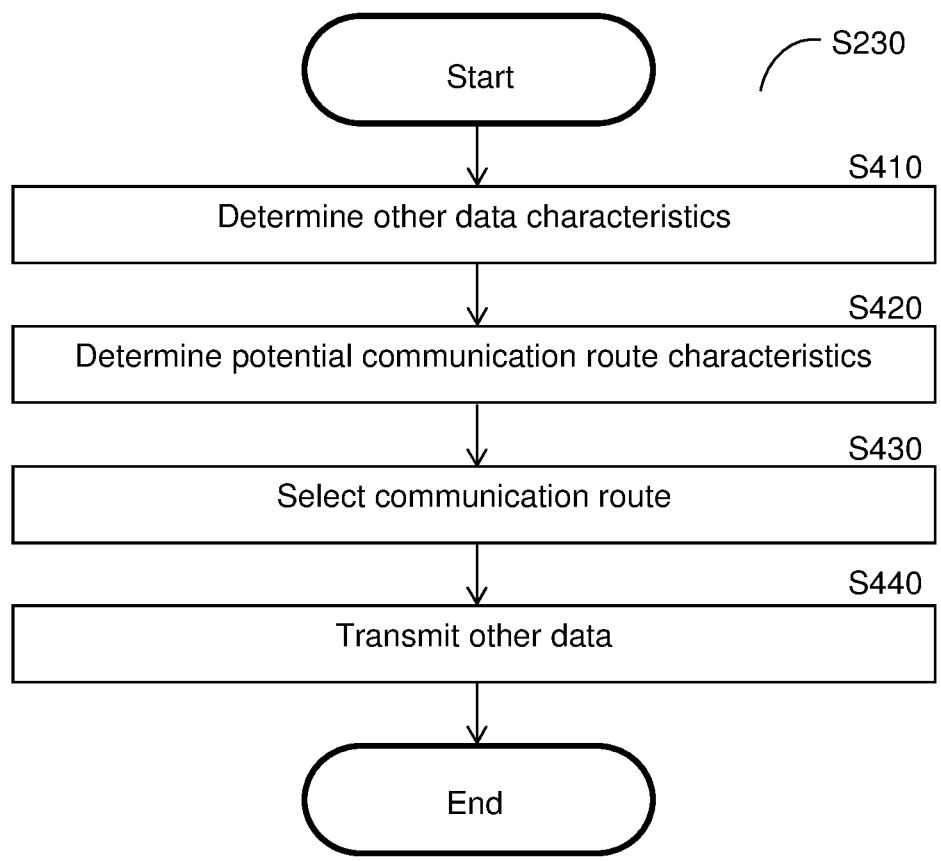
FIG. 4 is a flowchart illustrating a method for determining a preferred communication route for transmitting data in a distributed computing environment according to an embodiment.

FIG. 4 is a flowchart S230 illustrating a method for transmitting data excluding metadata in a distributed computing environment according to an embodiment. In an embodiment, the method is performed by one of the delivery systems 120, FIG. 1.

At optional S410, a set of characteristics of the data other than metadata is determined. The other data characteristics may include, but are not limited to, total size.

At S420, a set of characteristics associated with each of multiple potential communication routes is determined. In an embodiment, the potential communication route characteristics for other data transmission include at least bandwidth.

At S430, a communication route for transmitting the other data is selected based on the sets of characteristics of the other data and each of the potential communication routes.

In an embodiment, S430 is based on a set of one or more other data communication route selection rules. The other data communication route selection rules are predetermined rules prioritize rate of data transfer to the destination. In this regard, it has been identified that, for transmission of data other than metadata, it is desirable to transmit the data using the highest rate. To this end, in an embodiment, the other data communication selection rules prioritize high bandwidth over other factors such as, but not limited to, low latency. Thus, although other communication routes may have lower latency, the communication route selected to be used for transmitting the other data would be a communication route having higher bandwidth than that of other communication routes since such high bandwidth is better for transmitting other data.

The other data communication route selection rules may further take into consideration characteristics of the other data such as, but not limited to, total size of the other data. To this end, the metadata communication route selection rules may establish maximum thresholds for, for example, latency. Thus, even though high bandwidth is prioritized, latency may be required to meet such a maximum threshold in order to ensure that the other data is not sent over a prohibitively long path.

At S440, the other data is transmitted using the selected communication route.

It should also be noted that the embodiments described regarding FIGS. 2-4 are discussed with respect to determining characteristics of communication routes separately for metadata and other data (i.e., steps 330 and 430, respectively), but that results of one determination of communication route characteristics may be utilized without redetermining the communication route characteristics without departing from the scope of the disclosure (for example, when the communication route characteristics include both characteristics that are relevant to metadata transmission such as latency as well as characteristics that are relevant to transmission of other data such as bandwidth). Alternatively, different characteristics may be determined for metadata and other data transmission such that these determinations are performed separately.

It should also be noted that the first and second communication routes may, in some implementations, ultimately be selected such that the same communication route is used for both metadata and other data. As a non-limiting example, the same communication route may be used for metadata and other data when that communication route has both the lowest latency and the highest bandwidth among potential communication routes or when that communication route has the lowest latency among potential communication routes meeting a threshold bandwidth, the highest bandwidth among potential communication routes meeting a threshold latency, or both.

Figure 5:
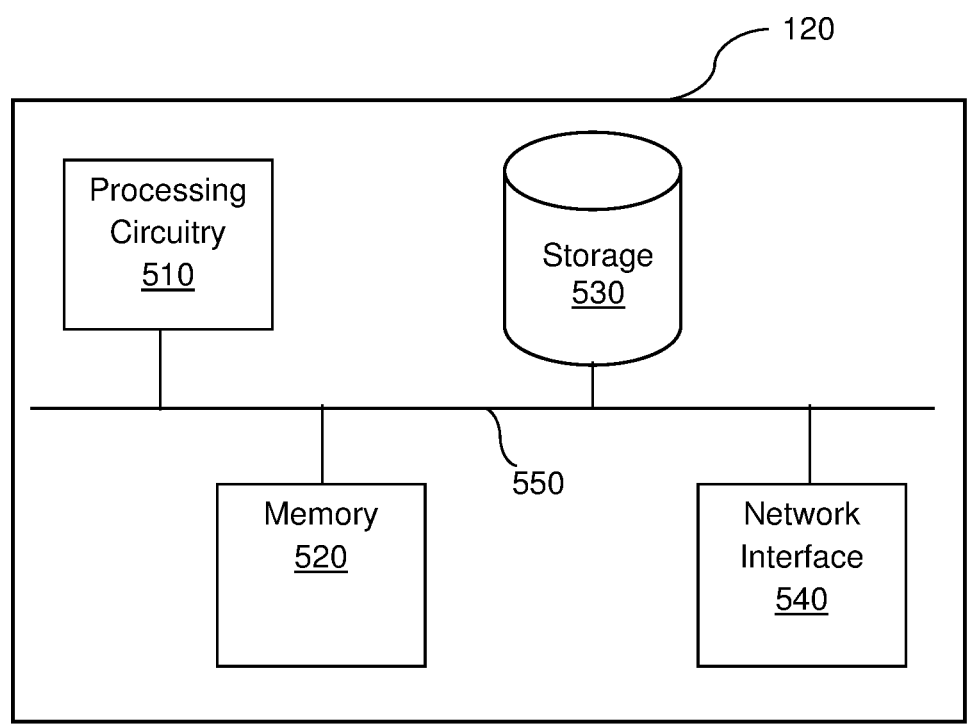
FIG. 5 is a schematic diagram of a data delivery system according to an embodiment.

FIG. 5 is an example schematic diagram of a delivery system 120 according to an embodiment. The delivery system 120 includes a processing circuitry 510 coupled to a memory 520, a storage 530, and a network interface 540. In an embodiment, the components of the delivery system 120 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the delivery system 120 to communicate with the storage devices 130 for the purpose of, for example, receiving data for transmission, transmitting data, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for transmitting data in a distributed computing environment, comprising:
   transmitting, by a delivery system configured to control transmission of data from an origin over at least one network, a first portion of data from the origin to a destination using a first communication route, wherein the first communication route is selected from among a first plurality of potential communication routes based on a plurality of characteristics of each of the first plurality of potential communication routes, wherein the first portion of data consists of metadata, wherein the first communication route is an optimal communication route for transmitting metadata, wherein each of the origin and the destination is a data storage, wherein the plurality of characteristics of each of the first plurality of potential communication routes includes a latency of each of the first plurality of potential communication routes, wherein the first communication route is selected based further on at least one metadata communication route transmission rule, wherein the first communication route has a lowest latency among at least one potential communication route of the first plurality of potential communication routes; and
   transmitting, by the delivery system, a second portion of data from the origin to the destination using a second communication route, wherein the second communication route is selected from among a second plurality of potential communication routes based on a plurality of characteristics of each of the second plurality of potential communication routes, wherein the second portion of data excludes metadata, wherein the second communication route is an optimal communication route for transmitting data other than metadata.

2. The method of claim 1, wherein the plurality of characteristics of each of the second plurality of potential communication routes further includes a bandwidth of each of the second plurality of potential communication routes, wherein each of the at least one potential communication route of the second plurality of potential communication routes meets at least one threshold bandwidth requirement.

3. The method of claim 1, wherein the plurality of characteristics of each of the second plurality of potential communication routes includes a bandwidth of each of the second plurality of potential communication routes, wherein the second communication route is selected based further on at least one other data communication route transmission rule, wherein the second communication route has a highest bandwidth among at least one potential communication route of the second plurality of potential communication routes.

4. The method of claim 3, wherein the plurality of characteristics of each of the second plurality of potential communication routes further includes a latency of each of the second plurality of potential communication routes, wherein each of the at least one potential communication route of the second plurality of potential communication routes meets at least one threshold latency requirement.

5. The method of claim 1, further comprising:
   storing the second portion of data in the delivery system until the second portion of data is received at the destination.

6. The method of claim 1, wherein the delivery system is a first delivery system, wherein transmitting a portion of data using at least one of the first communication route and the second communication route includes transmitting the respective portion of data to at least one second delivery system over a backbone network.

7. A system for transmitting data in a distributed computing environment, comprising:
   a processing circuitry; and
   a memory, the memory containing instructions that, when executed by the processing circuitry, configure the system to:
   transmit a first portion of data from an origin to a destination using a first communication route, wherein the first communication route is selected from among a first plurality of potential communication routes based on a plurality of characteristics of each of the first plurality of potential communication routes, wherein the first portion of data consists of metadata, wherein the first communication route is an optimal communication route for transmitting metadata, wherein each of the origin and the destination is a data storage, wherein the system is configured to control transmission of data from the origin over at least one network, wherein the plurality of characteristics of each of the first plurality of potential communication routes includes a latency of each of the first plurality of potential communication routes, wherein the first communication route is selected based further on at least one metadata communication route transmission rule, wherein the first communication route has a lowest latency among at least one potential communication route of the first plurality of potential communication routes; and
   transmit a second portion of data from the origin to the destination using a second communication route, wherein the second communication route is selected from among a second plurality of potential communication routes based on a plurality of characteristics of each of the second plurality of potential communication routes, wherein the second portion of data excludes metadata, wherein the second communication route is an optimal communication route for transmitting data other than metadata.

8. The system of claim 7, wherein the plurality of characteristics of each of the second plurality of potential communication routes further includes a bandwidth of each of the second plurality of potential communication routes, wherein each of the at least one potential communication route of the first plurality of potential communication routes meets at least one threshold bandwidth requirement.

9. The system of claim 7, wherein the plurality of characteristics of each of the second plurality of potential communication routes includes a bandwidth of each of the second plurality of potential communication routes, wherein the second communication route is selected based further on at least one other data communication route transmission rule, wherein the second communication route has a highest bandwidth among at least one potential communication route of the second plurality of potential communication routes.

10. The system of claim 9, wherein the plurality of characteristics of each of the second plurality of potential communication routes further includes a latency of each of the second plurality of potential communication routes, wherein each of the at least one potential communication route of the second plurality of potential communication routes meets at least one threshold latency requirement.

11. The system of claim 7, further comprising:
storing the second portion of data in the system until the second portion of data is received at the destination.

12. The system of claim 7, wherein the system is a first delivery system, wherein transmitting a portion of data using at least one of the first communication route and the second communication route includes transmitting the respective portion of data to at least one second delivery system over a backbone network.

* * * * *